United States Patent
Volk

[11] 3,923,498
[45] Dec. 2, 1975

[54] PROCESS FOR THE REDUCTION OF TITANIFEROUS ORES

[75] Inventor: William Volk, Princeton, N.J.

[73] Assignee: Hydrocarbon Research, Inc., Morristown, N.J.

[22] Filed: Aug. 19, 1974

[21] Appl. No.: 498,328

Related U.S. Application Data

[63] Continuation of Ser. No. 318,219, Dec. 26, 1972, abandoned.

[52] U.S. Cl.............................. 75/35; 75/1 TI; 75/26
[51] Int. Cl.² ........................................... C21B 13/00
[58] Field of Search.......................... 75/1 TI, 26, 35

[56] References Cited
UNITED STATES PATENTS

| | | |
|---|---|---|
| 1,868,512 | 7/1932 | Ahlmann ................................ 75/37 |
| 3,257,198 | 6/1966 | Volk et al. ............................. 75/1 X |
| 3,383,200 | 5/1968 | Volk ...................................... 75/1 X |
| 3,591,363 | 7/1971 | Campbell ............................... 75/26 |
| 3,658,508 | 4/1972 | Weir et al. ............................. 75/26 |

Primary Examiner—M. J. Andrews

[57] ABSTRACT

Iron oxide in titaniferous type ores is continuously reduced in an externally fired tubular reduction zone containing a helical-shaped transfer conduit heating coil through which the ore is carried in dilute phase by hot hydrogen gas used as transfer agent and reductant. An external heat transmitting source for the coil is provided so that cold ore can be treated without prior heating and so that the usual separate reducing reactor can be eliminated.

2 Claims, 1 Drawing Figure

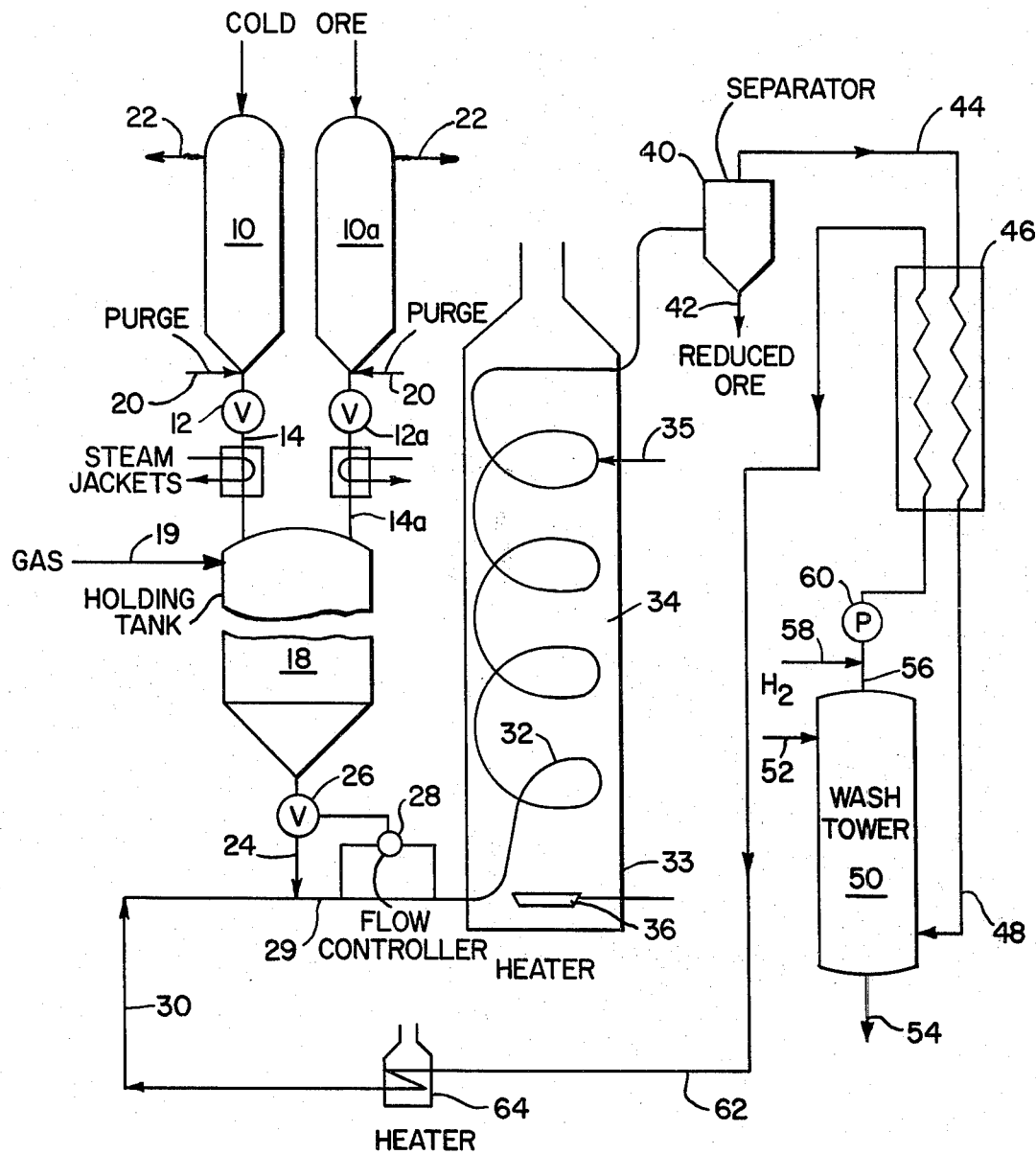

PROCESS FOR THE REDUCTION OF TITANIFEROUS ORES

This is a continuation of application Ser. No. 318,219 filed Dec. 26, 1972, now abandoned.

BACKGROUND OF THE INVENTION

The fluid bed reduction of the iron oxide in titaniferous ores of the ilmenite type is disclosed in U.S. Pat. Nos. 3,257,198 and 3,383,200 in which I am an inventor. As pointed out therein, it is desirable to reduce the iron oxide component without breaking down the $TiO_2$ radical. It has also been disclosed, that contrasted to the reduction of hematite or magnetite, it is usually necessary to carry out the reduction at temperatures above 1100°F and often as high as 1600°F.

It will be appreciated, however, that such increased temperatures require a very expensive heating of the hydrogen reducing gas, which must necessarily be heated to a higher degree than the ore to heat the ore and to accomplish the necessary reduction.

The problem of heating the ore to the desired temperature has been discussed in the U.S. Pat. No. 3,364,011 to Porter, who notes that "it was found impractical to supply all the heat for the reduction by excessively pre-heating the ore feed because at extremely high temperatures sintering, agglomeration and defluidization of the fluidized bed of the ore would occur." It was further stated by Porter "The known processes of supplying heat to the reduction zones and for circulating or recycling reducing gases have proved to be inefficient and uneconomic to carry out commercial direct iron ore reduction."

It will be appreciated that this problem is even more complicated where reduction temperature in the range of 1300°F and higher is necessary.

SUMMARY OF THE INVENTION

This invention relates to a process for continuously heating and reducing iron oxide in ores of the titaniferous type by passing the ore in the presence of a heated reducing gas such as hydrogen through a helical-shaped tubular conduit mounted in a fired heater. The helical conduit is designed so that the reducing gas will not only transfer the ore at a rate such that the slippage allows the ore to reach the desired degree of heating, but it also avoids excessive heating of the reducing gas. This time-temperature heating of the ore is such that about 25 to 50% of the oxygen associated with the iron in the form of iron oxide in the ore is reacted with the reducing gas during the transfer through the conduit.

DESCRIPTION OF THE DRAWINGS

The FIGURE is a schematic view of major components in a process for the direct reduction of a titaniferous type ore.

DESCRIPTION OF A PREFERRED EMBODIMENT

As illustrated in the FIGURE, the cold ore in particulate form is initially introduced to one or more hoppers 10, 10a, from which it will flow by gravity feed under control of valves 12 and 12a through steam-jacketed lines 14 or 14a into the holding tank 18. The hoppers 10 and 10a will usually be purged with dry gas at 20 which discharges at 22, such gas normally being nitrogen, to secure the removal of air and other contaminants from the ore. Preferably, the hoppers 10 and 10a will contain about 24 hour supply of ore, so that the ore passed into the holding tank 18 will maintain the level in the holding tank relatively constant.

By the time the ore has reached holding tank 18, it has been warmed by the steam jackets to approximately 250°F. This temperature is convenient for ease in the ore transfer operations particularly so as to prevent freezing in winter etc., and otherwise has no process significance.

The tank 18 is normally pressurized by gas at 19 as necessary to discharge the ore into the transfer line 24, containing valve 26 which is controlled by flow controller 28. This flow controller senses the pressure drop along a portion of the fluidized ore transfer conduit 29, and thereby controls the rate of particulate ore flow from transfer line 24 so as to maintain a relatively constant density of fluidized ore in the transfer conduit 29.

The gas source for the transfer conduit 29 is preferably the reducing gas, which as hereinafter discussed is a hydrogen-rich gas in recycle line 30. This recycle reducing gas has a temperature between 800°F and 1500°F and a pressure between 100 and 1,000 psig.

The transfer conduit 29 passes the fluidized ore into a tubular heating zone comprising tube 32, which is preferably helical-shaped and is made of heat resistant metal. Tube 32 is mounted within a thermally-insulated chamber 33 so as to form an externally-fired heater 34. The heat source used for heater 34 may be burning fuel oil or natural gas supplied to burner 36. The ore is continuously heated to the desired reduction temperature during its passage through coiled tube 32. The fired heater 34 simultaneously serves to externally heat coil 32, thereby providing the principal heat input for the recycle transfer gas from line 30 to the extent of 2,000 to 12,000 Btu/hr/sq.ft. surface area. Thus, the recycle gas in line 30 need not be substantially pre-heated Heating coil 32 is preferably vertically-oriented within the chamber 33 in order to achieve the most compact heater design, and is preferably arranged to have the reducing gas and particulate ore flowing upwardly through the coil.

A helical-shaped coil 32, for example having a nominal outside diameter between 6 feet and 20 feet and made of suitable metal tubing which itself is normally in the size range of 3 to 6 inches diameter, can be utilized to establish a desired slippage or slip factor for the particulate ore, in the gas flowing therethrough. The slip factor may be defined as the ratio of the density of the fluidized ore within the heating coil 32 to the density of the ore fed to the coil from transfer conduit 29. For example, if the density of the gas-ore mixture in the coil is 5 lbs/cu.ft. and the density of the ore mixture fed to the coil is 1 lb/cu.ft., then the slip factor is 5. An equivalent definition of the slip factor is the ratio of the velocity of the flowing gas within coil 32 to the velocity of the flowing solids. If, for example, the gas flows at a velocity five times that of the particulate solids, the slip factor is likewise 5. The particular slip factor used in ore reduction in heating coil 32 will depend principally upon the particle size range and density of the ore being processed, the amount of iron oxide reduction required, and the reducing gas flow rate, as well as other factors of the system. For reducing titaniferous type ores, the slip factor should be at least 3 and preferably greater than about 5.

The flow controller 28 is particularly advantageous for controlling the dilute phase loading on the ore reduction system, by measuring the pressure drop of a section of conduit 29 upstream of the heating coil 32, so that the instantaneous dilute phase loading at the inlet to the heating zone can be maintained independently of the slip characteristics of the ore within the coil. Although the preferred arrangement maintains the desired slip factor by varying the ore feed in a constant gas flow rate, it is equally possible to maintain the slip factor by varying the gas flow with a constant ore feed rate.

The iron ore reduction in the heating coil 32 is such that the oxygen in the ore undergoes at least a 40 percent reduction within the limits set by the equilibrium of reduction reactions as follows:

$$\frac{1}{4} Fe_3O_4 \text{ plus } H_2 \rightarrow \frac{3}{4} Fe \text{ plus } H_2O$$
$$Fe_2O_3 \text{ plus } 3H_2 \rightarrow 2 Fe \text{ plus } 3H_2O$$

The reduction temperatures for ilmenite ores are at least 1,300°F. However, by using the apparatus described herein, it is possible to reach 1,650°F which will accomplish up to 50% reduction of the oxygen component. Thus, by the use of this invention the reduction of the iron oxide in the titaniferous ore is satisfactorily completed within the coiled heating zone and the reduced material may then be acid leached in the well-known manner. If complete reduction is required, a multiple bed process as shown in my patents above-mentioned can be used.

The addition of supplemental dry hydrogen gas directly to the helical heating coil 32 at one or more points 35 will create a dilution effect therein, so that the difference between the equilibrium water content and the actual water content at such location can be controlled. Such addition of dry hydrogen to the coil will thus decrease the percentage of water vapor in the reduction system, and also serve to maintain adequate fluidation of the ore within the heating coil.

The titaniferous type ores processed in accordance with this invention should be of relatively uniform fine particle size, with all particles passing 20 mesh and not more than 25 percent passing 325 mesh (U.S. Sieve Series). Preferably, the pressures used in the coil 32 are in the range of 200 to 650 psig and temperatures are normally in the range of 1300°–1500°F.

In this ore reduction system, the effluent from the reduction zone heating coil 32 includes mixed ores and vapors. These pass to a cyclone separator 40, which separates the reduced ore solids at 42 from the hot gas removed at 44. The gas stream 44 is passed to heat exchanger 46 wherein it is cooled against cleaned warming gas and passed through line 48 to wash tower 50. In such tower, water is introduced at 52 and removed at 54.

The resulting scrubbed gas at 56, together with make-up hydrogen gas conveniently added at 58, is recompressed at 60 and returned to heat exchanger 46 for rewarming against hot gas stream 44. The resulting warm gas stream 62 may be reheated as desired in heater 64 to become the hydrogen-rich transfer gas heretofore noted in line 30.

The make-up hydrogen added at 58 is preferably such that the total feed gas at 30 is relatively high purity, such as described in the Keith U.S. Pat. No. 2,900,246, i.e. low in water and carbon oxide content.

Some advantage is achieved by preoxidizing the raw ilmenite ore so that iron originally present as FeO is oxidized to $Fe_2O_3$. The $Fe_2O_3$ present in the oxidized ore is more readily reduced at the conditions of this invention than is FeO. The heat put into the ore during the roasting operation decreases in an equal amount the heat duty required in the reduction steps. Preoxidation can be accomplished in a fluid bed using air at about 1600°F.

EXAMPLES

Titaniferous ores such as ilmenite for which this invention is useful for reducing the iron oxide portion usually contain at least about 20% iron oxide and more than about 40% titanium dioxide. Table I lists some typical titaniferous ores which may be processed using this invention.

TABLE I

| ORE | EXAMPLES OF TITANIFEROUS ORES | | | | |
| --- | --- | --- | --- | --- | --- |
|  | I | II | III | IV | V |
|  | 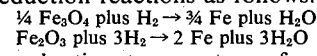 | | | | |
|  | MacIntyre | Quilon | | | |
| Gross Analysis, W % | | | | | |
| Iron Oxides | 44.9 | 35.7 | 44.1 | 40.62 | 48.0 |
| TiO$_2$ | 43.5 | 60.3 | 49.8 | 55.43 | 50.0 |
| Other | 11.6 | 4.0 | 6.1 | 3.95 | 2.0 |
| Ultimate Analysis, W % | | | | | |
| Fe | | 25.0 | 33.26 | 30.15 | 29.63 |
| Reducible O$_2$ | | 9.6 | 10.47 | 11.23 | 12.76 |
| TiO$_2$ | | 59.8 | 49.8 | 55.43 | 54.47 |
| SiO$_2$ | | 1.0 | 1.0 | 1.44 | 1.41 |
| Al$_2$O$_3$ | | 2.0 | 1.0 | | |
| MgO | | 1.1 | | | |
| Others | | 2.0 | 4.47 | 1.75 | 1.73 |

Reduction that can be achieved at temperatures in the range of 1350° to 1400°F with ores II and IV of Table I, for example, are shown in Table II.

TABLE II

| ORE | II | IV |
| --- | --- | --- |
| Temperature, °F | 1350° | 1400° |
| Residence Time, Seconds | 40 | 60 |
| Reduction, % | 30 | 40 |

While I have shown and described a preferred form of embodiment of my invention, it will be apparent to those skilled in the art that modifications may be made thereto within the scope and spirit of the description herein and of the claims appended hereinafter.

I claim:

1. The method of fluidized direct reduction of the iron oxide in a particulate titaniferous ore without substantial reduction of titanium oxide using a hydrogen-rich reducing gas, wherein the ore is sized to all pass 20 mesh screen (U.S. Std.) with not more than 25 percent passing 325 mesh screen and which consists essentially of:

a. pressurizing said ore and feeding it at a controlled rate upwardly through a vertical tubular heating zone together with a hydrogen-rich reducing gas at a temperature in the order of at least 1,000°F and at a pressure of at least 100 psig under conditions to establish a dilute phase loading of the ore in the range of three to 5 pounds per cubic foot gas entering the heating zone;

b. externally heating the gas-ore mixture in said heating zone to a temperature above 1350°F but not in excess of 1650°F; and c. controlling the slip factor of the gas-ore mixture in the tubular heating zone in the order of at least 3 whereby a reduction in the range of 30 to 50 percent of the iron oxide is accomplished;

d. separating the reduced ore and gas effluent;

e. purifying the gas;

f. recycling the gas to the heating zone together with high purity make-up hydrogen; and g. removing the reduced ore as product.

2. The process of claim 1, wherein the ore is preoxidized to convert virtually all of the FeO in the ore to $Fe_2O_3$ prior to reduction.

* * * * *